(12) United States Patent
Slobodin et al.

(10) Patent No.: US 9,274,654 B2
(45) Date of Patent: Mar. 1, 2016

(54) PROJECTED CAPACITIVE TOUCH SENSING

(75) Inventors: David Elliott Slobodin, Lake Oswego, OR (US); Jonathan Westhues, New York, NY (US)

(73) Assignee: PERCEPTIVE PIXEL, INC., Redmond, WA (US)

( * ) Notice: Subject to any disclaimer, the term of this patent is extended or adjusted under 35 U.S.C. 154(b) by 401 days.

(21) Appl. No.: 12/913,491

(22) Filed: Oct. 27, 2010

(65) Prior Publication Data
US 2011/0096025 A1    Apr. 28, 2011

Related U.S. Application Data

(60) Provisional application No. 61/255,276, filed on Oct. 27, 2009.

(51) Int. Cl.
   *G06F 3/044* (2006.01)
(52) U.S. Cl.
   CPC ...... *G06F 3/044* (2013.01); *G06F 2203/04105* (2013.01); *G06F 2203/04109* (2013.01)
(58) Field of Classification Search
   CPC ..... G06F 3/044; G06F 3/0488; G06F 3/0412; G06F 3/0418; G06F 3/0421; G06F 3/046; G06F 2203/04105; G06F 2203/04109
   USPC ..................... 345/173–175; 178/18.01, 18.03
   See application file for complete search history.

(56) References Cited

U.S. PATENT DOCUMENTS

| | | | |
|---|---|---|---|
| 4,233,522 A | 11/1980 | Grummer et al. | |
| 6,002,389 A * | 12/1999 | Kasser | 345/173 |
| 6,006,386 A | 12/1999 | Mohaupt | |
| 6,499,359 B1 | 12/2002 | Washeleski et al. | |
| 7,030,860 B1 | 4/2006 | Hsu et al. | |
| 2003/0234769 A1 | 12/2003 | Cross et al. | |
| 2006/0097991 A1 | 5/2006 | Hotelling et al. | |
| 2007/0046637 A1 * | 3/2007 | Choo | G06F 3/0202 345/169 |
| 2007/0165004 A1 | 7/2007 | Seelhammer et al. | |
| 2007/0216657 A1 | 9/2007 | Konicek | |
| 2008/0129701 A1 * | 6/2008 | Murakami | G06F 3/044 345/173 |
| 2009/0033341 A1 | 2/2009 | Son et al. | |
| 2009/0231305 A1 | 9/2009 | Hotelling et al. | |

FOREIGN PATENT DOCUMENTS

| | | |
|---|---|---|
| CN | 1675653 A | 9/2005 |
| CN | 101046720 A | 10/2007 |
| JP | 2001209491 A | 8/2001 |
| JP | 2007272898 A | 10/2007 |
| JP | 2010003048 A | 1/2010 |

(Continued)

OTHER PUBLICATIONS

International Search Report and Written Opinion in Application No. PCT/US2010/054324, mailed Dec. 23, 2010, 9 pages.

(Continued)

*Primary Examiner* — Aneeta Yodichkas
*Assistant Examiner* — Saifeldin Elnafia
(74) *Attorney, Agent, or Firm* — Brandon Roper; Judy Yee; Micky Minhas

(57) ABSTRACT

Methods, systems, and apparatus relate to touch sensors that are configured to measure input applied to the sensor from a user. Some implementations involve the measurement of changes in capacitance between pairs of adjacent patterned electrodes to detect input at a touch sensor.

21 Claims, 8 Drawing Sheets

(56) References Cited

FOREIGN PATENT DOCUMENTS

| | | |
|---|---|---|
| JP | 2010015412 A | 1/2010 |
| JP | 2011065515 A | 3/2011 |
| WO | 9718528 A1 | 5/1997 |
| WO | 2006035966 A1 | 4/2006 |

OTHER PUBLICATIONS

State Intellectual Property Office of the People's Republic of China, Office action of Patent Application No. 201080059534.1, Nov. 28, 2014, 19 pages.

Japanese Patent Office, Translation of Office Action Issued in Japanese Patent Application No. 2012-537008, Office Action mailed May 20, 2014, 8 Pages.

European Patent Office, Supplementary Search Report Issued in European Patent Application No. 10827440.8, Germany, Jun. 30, 2014, 3 Pages.

European Patent Office, Office Action Issued in European Patent Application No. 10827440.8, Germany, Jul. 9, 2014, 4 Pages.

State Intellectual Property Office of the People's Republic of China, Second Office Action and Search Report Issued in Chinese Patent Application No. 201080059534.1, Jul. 21, 2015, 11 Pages.

* cited by examiner

PROJECTED CAPACITIVE TOUCH SENSING

CROSS REFERENCE TO RELATED APPLICATIONS

The present application claims the benefit of U.S. Provisional Application No. 61/255,276, filed Oct. 27, 2009, which is incorporated herein by reference in its entirety for all purposes.

TECHNICAL FIELD

This disclosure relates to projected capacitive touch sensing and projected capacitive touch sensors.

BACKGROUND

Touch-sensitive systems detect and respond to one or more points of contact on a surface. A touch-sensitive system may be incorporated within an electronic device in the form of a touch screen display that allows a user to both view and manipulate objects using one or more inputs that contact the screen.

SUMMARY

Techniques are described for projected capacitive touch sensing technology.

In one aspect, a projected capacitive touch sensing system includes a common plate electrode and patterned capacitive touch sensing electrodes that are spaced apart from the common plate electrode, that are oriented parallel to the common plate electrode, and that are positioned such that pairs of adjacent patterned capacitive touch sensing electrodes experience a capacitance therebetween. The capacitance between a pair of adjacent patterned capacitive touch sensing electrodes changes based on changes in a distance between the common plate electrode and the pair of adjacent patterned capacitive touch sensing electrodes. The projected capacitive touch sensing system also includes deformable dielectric material positioned between the common plate electrode and the patterned electrodes and electronic circuitry configured to sense a change in capacitance between the pair of adjacent patterned capacitive touch sensing electrodes and determine an input based on the sensed change in capacitance between the pair of adjacent patterned capacitive touch sensing electrodes.

Implementations may include one or more of the following features. For example, the patterned capacitive touch sensing electrodes may include a series of column electrodes and a series of row electrodes that are oriented perpendicular to the column electrodes. In this example, the series of column electrodes and the series of row electrodes may be positioned such that adjacent row and column electrodes experience a capacitance therebetween, and the capacitance between a particular column electrode that is adjacent to a particular row electrode may change based on changes in a distance between the common plate electrode and the particular column electrode and the particular row electrode. Further, in this example, the electronic circuitry may be configured to sense a change in capacitance between the particular column electrode and the particular row electrode and determine an input based on the sensed change in capacitance between the particular column electrode and the particular row electrode.

In addition, the electronic circuitry may be configured to sense a capacitance between the particular column electrode and the particular row electrode independently of a capacitance between the particular column electrode and the common plate electrode and independently of a capacitance between the particular row electrode and the common plate electrode. The series of column electrodes and the series of row electrodes may be substantially coplanar.

In some implementations, the series of column electrodes may have a diamond pattern and the series of row electrodes may have a diamond pattern such that the column electrodes and the row electrodes each have diamond-shaped pads that are located at positions where the column electrodes and the row electrodes do not overlap and that are connected by relatively narrow lines located at positions where the column electrodes and the row electrodes overlap. In these implementations, a capacitance between a diamond-shaped pad of the particular column electrode that is adjacent to a diamond-shaped pad of the particular row electrode may change based on changes in a distance between the common plate electrode and the particular column electrode and the particular row electrode. Also, in these implementations, the electronic circuitry may be configured to sense a change in capacitance between the diamond-shaped pad of the particular column electrode and the diamond-shaped pad of the particular row electrode and determine an input based on the sensed change in capacitance between the diamond-shaped pad of the particular column electrode and the diamond-shaped pad of the particular row electrode.

In some examples, the electronic circuitry may include transmitters that are each positioned at one of the column electrodes and that are each configured to apply an excitation voltage to the corresponding column electrode and receivers that are each positioned at one of the row electrodes and that are each configured to measure a current coupled into the corresponding row electrode based on excitation voltages applied to the column electrodes. In these examples, the electronic circuitry also may include a processor configured to control the transmitters to apply excitation voltages to the column electrodes in a sequence in which only one column electrode is applied with an excitation voltage at a time and the processor may be configured to sense a change in capacitance between the particular column electrode and the particular row electrode by sensing a change in current measured by the receiver positioned at the particular row electrode at a time when the transmitter positioned at the particular column electrode was applying an excitation voltage to the particular column electrode.

The electronic circuitry may be configured to sense a decrease in capacitance between the pair of adjacent patterned capacitive touch sensing electrodes and determine an input based on the sensed decrease in capacitance between the pair of adjacent patterned capacitive touch sensing electrodes. In addition, the electronic circuitry may be configured to sense an increase in capacitance between the pair of adjacent patterned capacitive touch sensing electrodes and determine an input based on the sensed increase in capacitance between the pair of adjacent patterned capacitive touch sensing electrodes. Further, the deformable dielectric material positioned between the common plate electrode and the patterned electrodes may include an elastomer, a fluid, such as a fluid that is substantially air, or a sheet of compressible dielectric material.

In some implementations, the projected capacitive touch sensing system may include a display device that is configured to display an image and that is positioned below the common plate electrode, the patterned capacitive touch sensing electrodes, and the deformable dielectric material. In theses implementations, the common plate electrode may be made of a transparent conductive material, the patterned capacitive touch sensing electrodes may be made of the transparent conductive material, and the deformable dielectric material may have an index of refraction that matches an index of refraction of the transparent conductive material such that images displayed by the display device are perceivable through the common plate electrode, the patterned capacitive touch sensing electrodes, and the deformable dielectric material. In addition, in these implementations, the electronic circuitry may be configured to determine a location of the determined input, map the location of the determined input to an image displayed by the display device, and control an application based on the mapping of the location of the determined input to an image displayed by the display device.

The electronic circuitry may be configured to determine a touch input based on the sensed change in capacitance between the pair of adjacent patterned capacitive touch sensing electrodes. The electronic circuitry also may be configured to sense an amount of change in capacitance between the pair of adjacent patterned capacitive touch sensing electrodes and determine an amount of force supplied based on the amount of change in capacitance between the pair of adjacent patterned capacitive touch sensing electrodes.

In some examples, the projected capacitive touch sensing system may include a first substrate on which the common plate electrode is positioned and a second substrate on which the patterned capacitive touch sensing electrodes are positioned. The first and second substrates may be oriented such that the common plate electrode faces the patterned capacitive touch sensing electrodes and may be configured to enable relative movement between the common plate electrode and the patterned capacitive touch sensing electrodes in response to a touch input. In these examples, the first substrate may be relatively flexible and the second substrate may be relatively rigid. Further, in these examples, the first substrate may have a surface that receives a touch input and may be configured to bend in response to force applied by the touch input, thereby moving the common plate electrode closer to the patterned capacitive touch sensing electrodes in a vicinity of a contact point of the touch input. The first substrate may isolate electric fields from outside of the touch sensing system from impacting the capacitance between the pair of adjacent patterned capacitive touch sensing electrodes.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

A projected capacitive touch sensor incorporates a deformable, insulating elastomer or fluid between a top substrate and a bottom substrate, one or both of which are coated with transparent conductor (e.g., indium tin oxide (ITO)) electrode films. When contact is made with the top substrate by an input mechanism (e.g., a finger or a stylus), the top substrate bends, at least partially, in the region where the contact is made, causing a change in the distance between the transparent conductor electrode films on the top and/or bottom substrates at the point of contact, and perhaps to a lesser extent, at points proximate thereto. The location of the touch, therefore, can be determined by sensing the change in capacitance caused by the change in distance and material separating the transparent conductor films on the top and/or bottom substrates. Furthermore, the bending of the top substrate and the deformable, insulating elastomer or fluid provides a compliant feel that may be consistent with the response to the application of pressure that is expected by a user. In typical implementations, the projected capacitive touch sensor is formed over a display device (e.g., a liquid crystal display (LCD) device, a plasma display panel (PDP) device, or an organic light-emitting diode (OLED) display device) enabling a user to interact with and control items displayed by the display device.

Figure 1A:
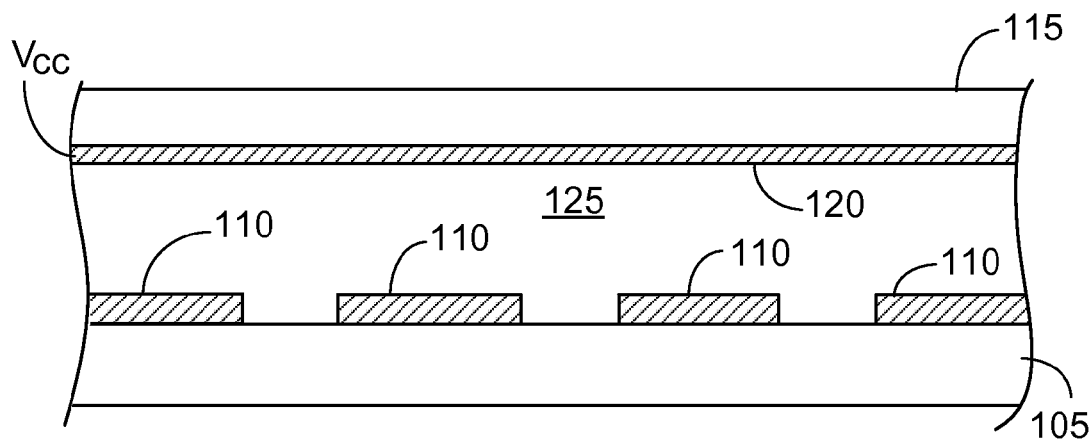
FIGS. 1A, 2A, 2C, 4A, 4B, 4C, 5, 6A, and 6B are diagrams of example projected capacitive touch sensors.

FIG. 1A is a diagram of a cross-section of a portion of a projected capacitive touch sensor. As illustrated in FIG. 1A, the projected capacitive touch sensor includes a first transparent and relatively rigid substrate 105 over which patterned capacitive sensing electrodes 110 composed of a transparent conductive material such as, for example, ITO, are located. A second transparent and relatively flexible substrate 115 is positioned above first transparent substrate 105, and a transparent common plate electrode 120 composed of, for example, ITO, is located on the surface of the second substrate 115 that is facing the first substrate 105. The first substrate 105 and the second substrate 115 may be composed from, for example, a glass and/or a polymer material. A cavity formed between the first substrate 105 and the second substrate 115 is occupied by a deformable, insulating (or semi-insulating) elastomer or fluid 125. This elastomer or fluid 125 generally is chosen such that its index of refraction matches, or is at least substantially similar to, the indices of refraction of transparent conductors 110 and 120 and transparent first and second substrates 105 and 115 so as to minimize interference with the display generated by an associated display device. In some examples, the fluid 125 may be air. In these examples, the cavity formed between the first substrate 105 and the second substrate 115 may be filled substantially with air with widely dispersed spacers to maintain the air gap when there is no pressure on the common plate electrode 120.

Figure 1B:
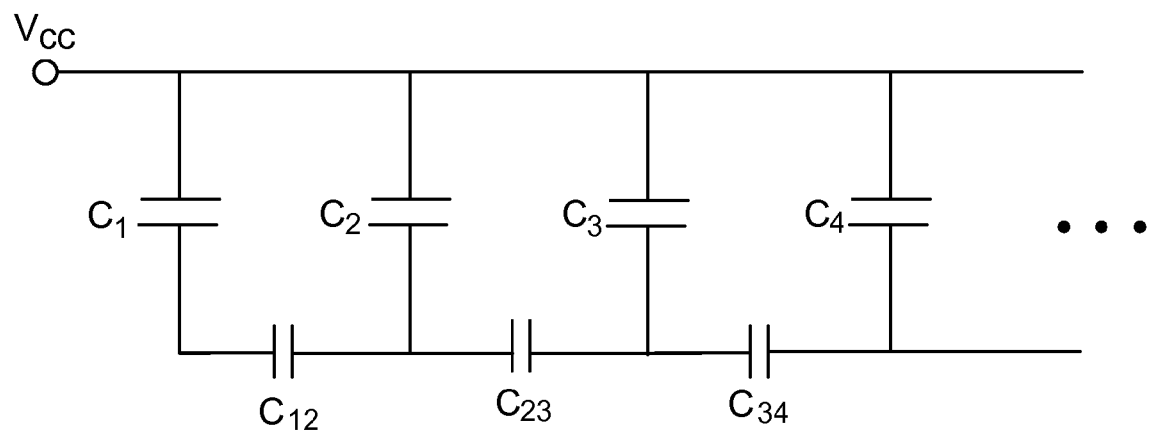
FIGS. 1B and 2B are effective circuit diagrams corresponding to electrical characteristics of an example projected capacitive touch sensor.

FIG. 1B is an effective circuit diagram corresponding to electrical characteristics of the portion of the projected capacitive touch sensor illustrated in FIG. 1A. As illustrated in FIG. 1B, the spacing between the electrodes (110, 120) and the presence of the insulating (or semi-insulating) elastomer or fluid (125) in the cavity between the first substrate (105) and the second substrate (115) cause capacitances $C_1$, $C_2$, $C_3$, and $C_4$ to be generated between patterned electrodes (110) and the common plate electrode (120). In addition, capacitances $C_{12}$, $C_{23}$, and $C_{34}$ also are formed between adjacent patterned electrodes (110).

Figure 2A:
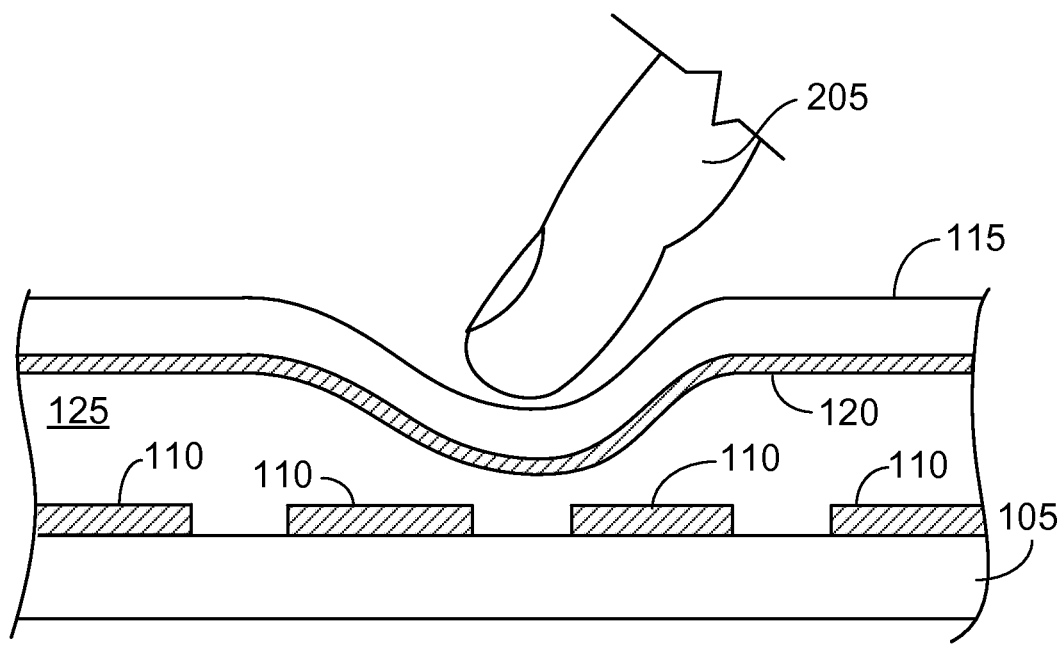
Figure 2B:
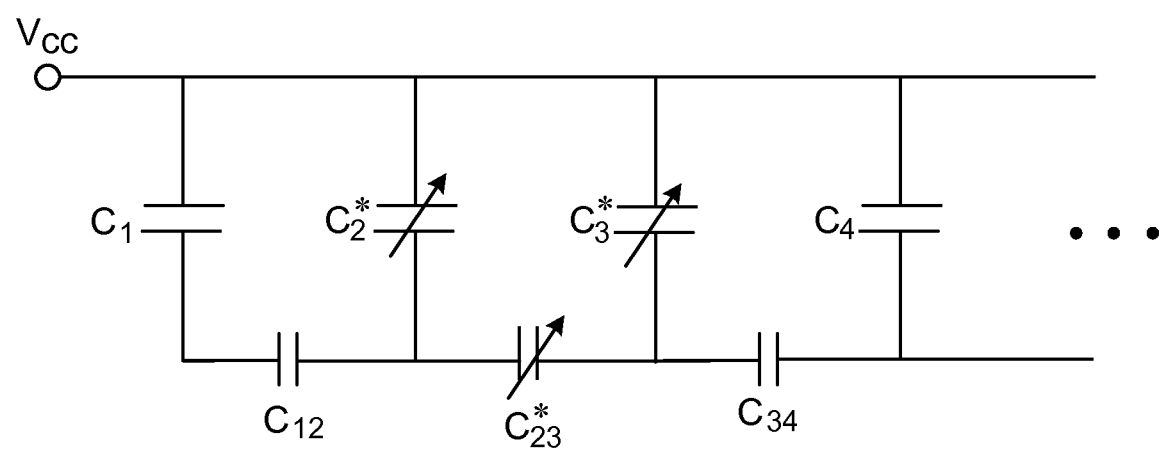

Referring now to FIG. 2A, when an input mechanism 205 (e.g., a finger or a stylus) contacts the second substrate 115, the pressure applied by the input mechanism 205 at the contact point causes the second substrate 115 to bend. In addition, the insulating (or semi-insulating) elastomer or fluid 125 also deforms or evacuates the space in the vicinity of the contact point due to the pressure applied by the input mechanism 205. As a result, the bent portion of the common plate electrode 120 is moved closer to the patterned electrodes 110, causing an increase in the capacitance between the common plate electrode 120 and the patterned electrodes 110 in the vicinity of the contact point. For example, referring to FIG. 2B, which illustrates the changes to the effective circuit diagram of FIG. 1B that result from contact being made by input mechanism 205 with the second substrate 115, capacitances $C_2$, $C_3$, and $C_{23}$ increase as a result of the contact made by input mechanism 205.

Although the changes in capacitance caused by contact by the input mechanism 205 with the second substrate 115 may be relatively small, they can be sensed, and the location at which the input mechanism 205 contacted the second substrate 115 can be detected by determining where and to what relative extent the changes in capacitance occurred.

Notably, the changes in capacitance that are used to detect touch involve changes to electric fields formed between the first substrate 105 and the second substrate 115. Because the second substrate 115 isolates these electric fields from the outside world, the second substrate 115 may be configured to function, at least partially, as an electromagnetic interference (EMI) shield, preventing, or at least reducing, unwanted interference with the electric fields by external disturbances. Furthermore, because the changes in capacitance that are used to detect touch are attributable to movements by the common plate electrode 120, the projected capacitive sensor may be capable of detecting contact by an input mechanism that is not well-grounded or even by an input mechanism that is insulating (e.g., a stylus).

In addition, because capacitance generally varies linearly with the displacement between two charged plates, in some implementations, the amount of pressure applied by the input mechanism 205 may be determined by sensing the magnitude of the changes in capacitance caused by contact made by the input mechanism 205 with the second substrate 115.

Figure 2C:
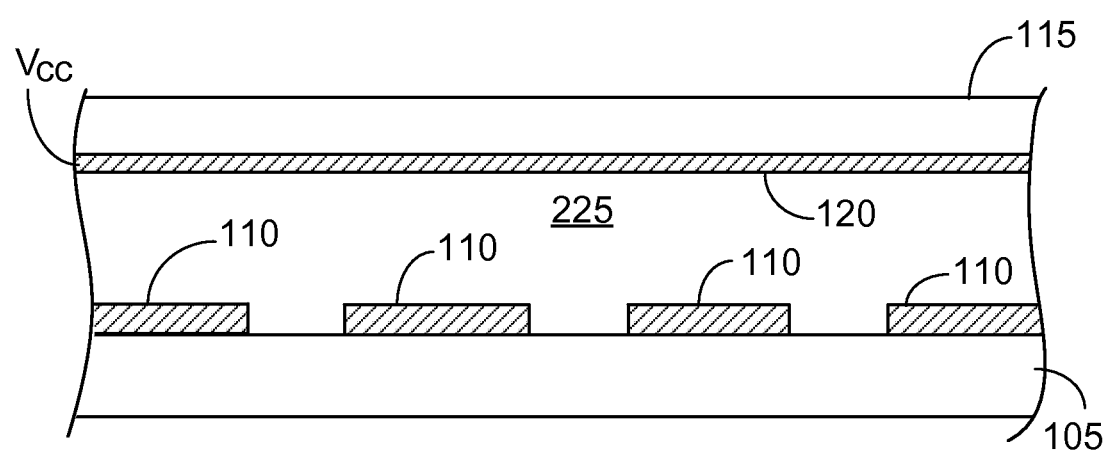

FIG. 2C illustrates another implementation of a projected capacitive touch sensor. As shown in FIG. 2C, the projected capacitive touch sensor includes a first transparent and relatively rigid substrate 105, patterned capacitive sensing electrodes 110, a second transparent and relatively flexible substrate 115, and a transparent common plate electrode 120. The first substrate 105, the patterned capacitive sensing electrodes 110, the second substrate 115, and the transparent common plate electrode 120 are similar to the same elements illustrated and described above with respect to FIGS. 1A and 2A. A difference between this implementation of a projected capacitive touch sensor and the implementation illustrated and described above with respect to FIGS. 1A and 2A is that the patterned electrodes 110 and the common plate electrode 120 are separated by a sheet 225 of compressible dielectric material, instead of the elastomer or fluid 125. The sheet 225 of compressible dielectric material is different from the elastomer or fluid 125 because it compresses and experiences a change in aggregate volume when pressed, whereas the elastomer or fluid 125 does not experience a change in aggregate volume when pressed.

The sheet 225 may include dielectric material that changes in volume as it is depressed and that resumes its shape when force is removed. For example, the sheet 225 may be made of a flexible material with air gaps (e.g., foam comprising mostly air or another compressible gas, with the rest of the foam made from a flexible material). In this example, the air gaps are optically transparent and air in the air gaps is compressible. Accordingly, when a user presses the touch sensor with an input mechanism (e.g., a finger or a stylus), the air in the air gaps compresses and accommodates the change in volume resulting from the depression caused by the input mechanism. Because the sheet 225 changes volume to accommodate the depression caused by the input mechanism, the sheet 225 allows the separation between the common plate electrode 120 and the patterned capacitive sensing electrodes 110 to decrease at the point of contact without causing a corresponding increase in separation between the common plate electrode 120 and the patterned capacitive sensing electrodes 110 at areas away from the point of contact caused by displacement of the dielectric material near the point of contact to the areas away from the point of contact. In this regard, the processing needed to detect an input may be simpler and more accurate because the impact of displaced dielectric material is reduced and does not need to be taken into account.

Although the implementation shown in FIG. 2C uses the sheet 225 of compressible dielectric material, instead of the elastomer or fluid 125, the effective circuit diagram and operation of the touch sensor is generally similar to the implementation illustrated and described above with respect to FIGS. 1A and 2A. Specifically, FIG. 1B also represents an effective circuit diagram corresponding to electrical characteristics of the portion of the projected capacitive touch sensor illustrated in FIG. 2C. As discussed above and illustrated in FIG. 1B, the spacing between the electrodes (110, 120) and the presence of an insulating (or semi-insulating) sheet (225) of compressible dielectric material in the cavity between the first substrate (105) and the second substrate (115) cause capacitances C1, C2, C3, and C4 to be generated between patterned electrodes (110) and the common plate electrode (120). In addition, capacitances C12, C23, and C34 also are formed between adjacent patterned electrodes (110).

Figure 3:
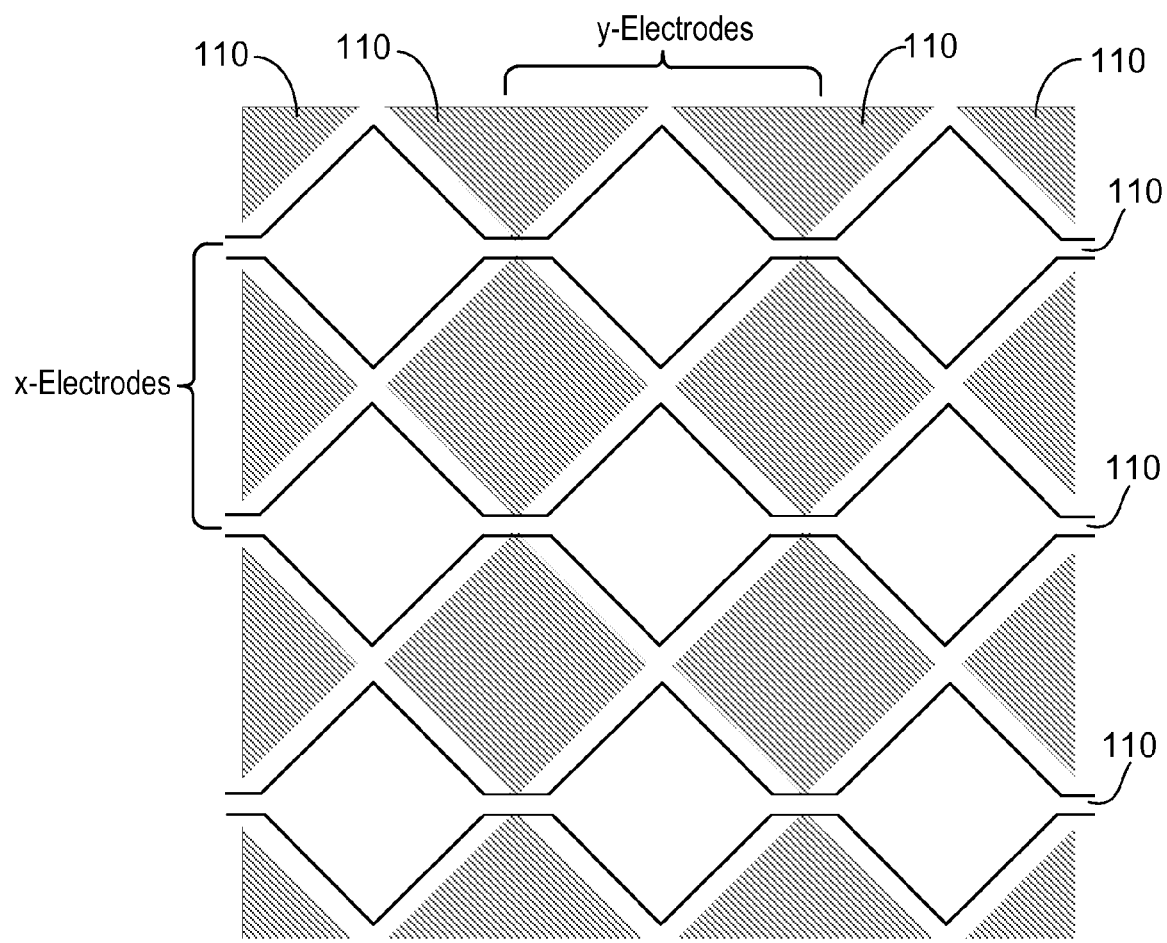
FIG. 3 illustrates an example patterning scheme for electrodes in an example projected capacitive touch sensor.

The patterned capacitive sensing electrodes 110 illustrated in FIGS. 1A, 2A, and 2C may be laid out in various different patterns. For example, as illustrated in FIG. 3, in some implementations, patterned electrodes 110 may be laid out according to a diamond patterning scheme in which rows and columns of overlapping electrodes 110 are formed in a diamond pattern. In this example, the row and column electrodes are positioned to be coplanar or as close to coplanar as possible. In the example shown in FIG. 3, the larger diamond-shaped portions of the row and column electrodes which do not overlap may be coplanar and the narrower connecting portions of the row and column electrodes which do overlap may be separated with a thin layer of dielectric between them. For instance, the narrower connecting portions of the row or column electrodes may be jumpers that allow the row and column electrodes to bypass each other at points of overlap.

In some implementations, the row electrodes may be positioned on the substrate 105, a thin dielectric layer may be positioned on the row electrodes, and the column electrodes may be positioned on the thin dielectric layer. In these implementations, the thin dielectric layer provides a space between the row electrodes and the column electrodes to prevent contact between the row electrodes and the column electrodes. A thickness of the thin dielectric layer may be minimized, so that the row electrodes and the column electrodes may be roughly coplanar (e.g., the separation between rows and columns is relatively small).

Because the row electrodes and the column electrodes are coplanar or roughly coplanar, the row electrodes and the column electrodes (e.g., the patterned electrodes 110) have been illustrated as being coplanar in FIGS. 1A, 2A, and 2C. Specifically, FIGS. 1A, 2A, and 2C illustrate an alternating pattern of coplanar (or roughly coplanar) row and column electrodes as the patterned electrodes 110. When the diamond pattern of row and column electrodes shown in FIG. 3 is used, the cross-section of the touch sensor illustrated in FIGS. 1A, 2A, and 2C would be taken along a diagonal of the pattern shown in FIG. 3. In particular, in the touch sensor illustrated in FIGS. 1A, 2A, and 2C, the first patterned electrode would be a larger diamond-shaped portion of a first column electrode, the second patterned electrode would be a larger diamond-shaped portion of a first row electrode, the third patterned electrode would be a larger diamond-shaped portion of a second column electrode, and the fourth patterned electrode would be a larger diamond-shaped portion of a second row electrode.

Figure 2D:
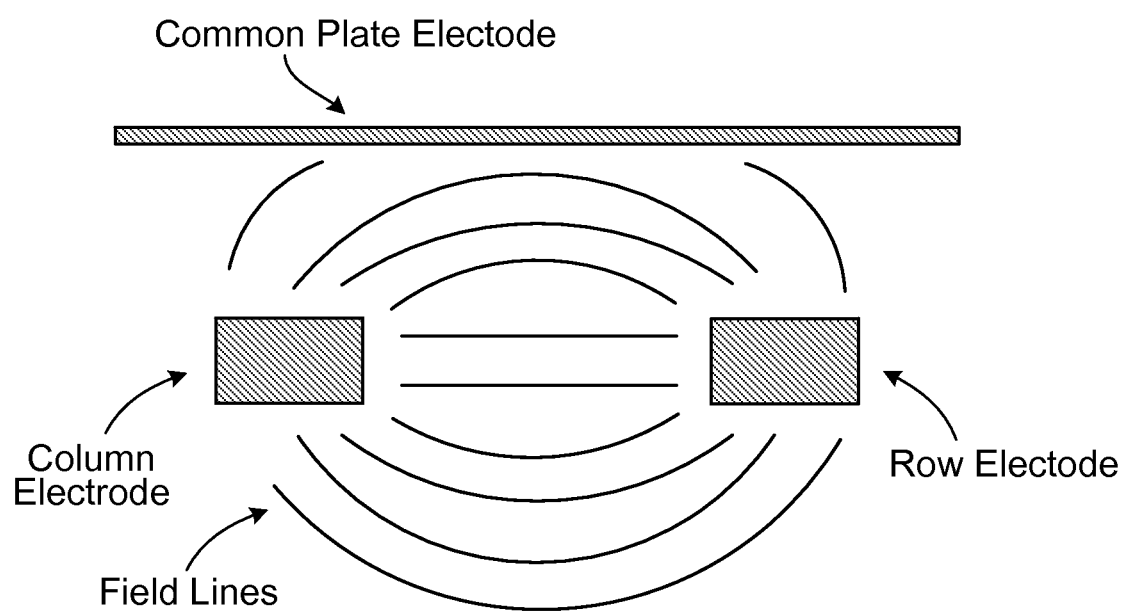
FIG. 2D illustrates example field lines between adjacent row and column electrodes.

Because the row electrodes and the column electrodes are coplanar or roughly coplanar (e.g., the separation between rows and columns is relatively small), the fringing field lines are roughly symmetric on both sides of the row electrodes and the column electrodes. FIG. 2D illustrates example fringing field lines around adjacent row and column electrodes in the touch sensor illustrated in FIG. 2C. Similar to FIG. 2C, the adjacent row and column electrodes are illustrated as being coplanar (which may occur when jumpers are used at overlapping portions of the row and column electrodes), but FIG. 2D also is intended to represent the field lines when the adjacent row and column electrodes are roughly coplanar and separated by a thin dielectric layer.

In FIG. 2D, the common plate electrode is grounded and an excitation voltage is applied to the column electrode (or the row electrode). In this configuration, the fringing field lines are symmetric (or roughly symmetric) on both sides of the row electrode and the column electrode, where on one side, fringing field lines extend toward a front of the touch sensor, and on another side, fringing field lines extend out away from the front of the touch sensor (e.g., on a back side and/or towards a display over which the touch sensor is positioned). The fringing field on the front side of the touch sensor is disrupted by the common plate electrode, which tends to decrease the measured capacitance between the row electrode and the column electrode. When the touch sensor is pressed with an object (e.g., a conductive or a non-conductive object), the common plate electrode is moved toward the adjacent row and column electrodes, which causes an additional portion of the fringing field on that front side of the sensor to be shorted or at least partially terminated by the grounded common plate electrode. As such, the current flowing through the column electrode flows, at least in part, into the common plate electrode, which decreases the measured capacitance between the adjacent row and column electrodes slightly, relative to the capacitance measured if that ground plane was not moved closer to the adjacent row and column electrodes. The change in capacitance between the adjacent row and column electrodes may be sensed by measuring the current coupled into the row electrode based on the excitation voltage applied to the column electrode, which decreases as more current flows into the common plate electrode when the common plate electrode is moved closer to the adjacent row and column electrodes.

FIG. 2D only illustrates a single pair of adjacent row and column electrodes (e.g., the first patterned electrode and the second patterned electrode shown in FIG. 2C or, in the implementation shown in FIG. 3, a larger diamond-shaped portion of a first column electrode shown in FIG. 3 and a larger diamond-shaped portion of a first row electrode). However, other pairs of adjacent row and column electrodes throughout the touch sensor experience similar fringing field lines and a capacitance measurement may be made for each pair of adjacent row and column electrodes throughout the touch sensor. When using the diamond patterning illustrated in FIG. 3, the capacitance measurements made for each pair of adjacent row and column electrodes throughout the touch sensor form a bitmap of capacitance measurements over a surface of the touch sensor. Accordingly, the bitmap of capacitance measurements between row and column electrodes may be used to accurately determine a location of one or more touch inputs by determining a location in the bitmap where one or more capacitance changes are sensed. Because the capacitance measurements form a bitmap over the surface of the touch sensor, the location of a touch input may be determined without ambiguity, even when multiple touch inputs are being provided at the same time.

Returning to FIG. 2C, similar to the operation of the projected capacitive touch sensor illustrated and described above with respect to FIGS. 1A and 2A, electronic circuitry of the touch sensor may detect input at the touch sensor (e.g., touch inputs) by sensing changes in the capacitances C1, C2, C3, and C4 between the patterned electrodes 110 and the common plate electrode 120 and/or the capacitances C12, C23, and C34 between the patterned electrodes 110 caused by an input mechanism (e.g., a finger or a stylus) contacting and pressing the second substrate 115. For example, the patterned capacitive sensing electrodes 110 may be arranged in a grid pattern with a series of row electrodes that are parallel to each other and a series of column electrodes that are parallel to each other and perpendicular to the row electrodes (e.g., the pattern shown in FIG. 3 may be used as discussed above). In this example, transmitters may be placed on the column electrodes and receivers may be placed on the row electrodes. The transmitters apply a time-varying excitation voltage on each column electrode, which causes current to be coupled into each row electrode. In some implementations, the transmitters may apply voltage to the column electrodes in sequence with voltage being applied to only a single column at any given time. In other implementations, the transmitters may apply voltage to the column electrodes partially in parallel, with orthogonal excitation waveforms used on multiple columns. For example, orthogonal excitation waveforms may be used on the multiple columns, as described in U.S. patent application Ser. No. 12/838,419, filed Jul. 16, 2010, which is incorporated by reference in its entirety.

The receivers measure the current coupled into each row electrode based on the excitation voltage applied to the column electrodes. A processor monitors the current measured by the receivers and detects a change in capacitance based on detecting a change in current. The processor then detects a touch input based on detection of the change in capacitance and determines a location of the touch input by determining which row electrode experienced the change in current and determining the column electrode on which voltage was being applied when the change in current was sensed.

In particular, similar to the example shown in FIG. 2A, when an input mechanism (e.g., a finger or a stylus) contacts the second substrate 115 in the touch sensor shown in FIG. 2C, the pressure applied by the input mechanism at the contact point causes the second substrate 115 to bend. The sheet 225 of compressible dielectric material deforms or compresses in the vicinity of the contact point due to the pressure applied by the input mechanism. As a result, the bent portion of the common plate electrode 120 is moved closer to the patterned electrodes 110, causing a change in the capacitance between adjacent patterned electrodes based on interruption, by the common plate electrode 120, of fringing field lines between the adjacent patterned electrodes. The change in capacitance causes a change in the current coupled into one or more of the row electrodes in the vicinity of the contact point. The processor detects the change in the current coupled into the one or more of the row electrodes and, thereby, senses the change in capacitance. The processor then uses the sensed change in capacitance to determine that an input to the touch sensor has been provided and determines a location of the input based on which row and column pair experienced the change in capacitance.

In some implementations, the touch sensor shown in FIG. 2C holds the voltage between the patterned electrodes 110 and the common plate electrode 120 constant and uses current sensors that have low impedance. With this structure, most (e.g., all) of the current flows to the current sensor through the low impedance path without escaping through a path to the common plate electrode 120. Accordingly, the current measurement made by the current sensor is impacted by the change in capacitance between adjacent patterned electrodes 110, but has relatively little (e.g., zero) impact from the capacitance between the patterned electrodes 110 and the common plate electrode 120. In this regard, the capacitance between adjacent patterned electrodes 110 may be measured independently of the capacitance between the patterned electrodes 110 and the common plate electrode 120.

In these implementations, the touch sensor shown in FIG. 2C may only sense changes in the capacitances $C12$, $C23$, and $C34$ between adjacent patterned electrodes 110 to detect an input to the touch sensor. In these implementations, the touch sensor may periodically/continuously sense the capacitances $C12$, $C23$, and $C34$ between adjacent patterned electrodes 110 and monitor the sensed capacitances $C12$, $C23$, and $C34$ for changes. For instance, when a user provides input similar to that shown in the example of FIG. 2A to the touch sensor shown in FIG. 2C, the capacitance $C23$ between the corresponding pair of patterned electrodes (e.g., adjacent row and column electrodes) changes in response to the input. Specifically, as the input mechanism contacts and begins to press the second substrate 115 at the contact point shown in FIG. 2A, the capacitance $C23$ decreases as the input mechanism depresses the common plate electrode 120 toward the adjacent patterned electrodes 110 and causes the common plate electrode 120 to interrupt more field lines between the adjacent patterned electrodes 110. The decrease in the capacitance $C23$ continues as the common plate electrode 120 is pressed closer to the adjacent patterned electrodes 110, which allows the amount of change in capacitance to be used to determine the force applied to the touch sensor by the input mechanism. By detecting this change in the capacitance $C23$, the touch sensor may detect an input to the touch sensor at a location corresponding to the capacitance $C23$.

For example, the touch sensor may monitor for decreases in capacitance between pairs of adjacent patterned electrodes 110 (e.g., adjacent row and column electrodes) and detect an input to the touch sensor (e.g., a touch input) when the touch sensor detects a decrease in capacitance between a particular pair of adjacent patterned electrodes 110 (e.g., a particular pair of adjacent row and column electrodes). Because the capacitance decreases when a touch input is first provided and continues to decrease as additional force is applied, the sensor may detect a touch input based on detecting a decrease in capacitance and determine an amount of force applied based on an amount of decrease in capacitance.

In some implementations, a history of capacitance measurements may be monitored and used to determine a type of input being provided to the touch sensor. In these implementations, when an input mechanism contacts and begins to press the second substrate 115 at a contact point, the capacitance between a pair of adjacent patterned electrodes (e.g., adjacent row and column electrodes) in the vicinity of the contact point decreases as the input mechanism presses the common plate electrode 120 toward the pair of adjacent patterned electrodes. When a user removes the force applied by the input mechanism (e.g., releases the press), the capacitance between the pair of adjacent patterned electrodes (e.g., adjacent row and column electrodes) in the vicinity of the contact point increases as the common plate electrode 120 moves away from the pair of adjacent patterned electrodes. By monitoring a history of capacitance decrease and subsequent increase, the touch sensor may be able to detect different types of touch inputs. For example, when the touch sensor detects an initial decrease in the capacitance between the pair of adjacent patterned electrodes, the touch sensor may monitor for a subsequent increase in the capacitance between the pair of adjacent patterned electrodes. In this example, when the touch sensor detects a subsequent increase in the capacitance between the pair of adjacent patterned electrodes within a threshold period of time after the initial decrease, the touch sensor may determine that a user has provided a touch and release input to the touch sensor. When the touch sensor does not detect a subsequent increase in the capacitance between the pair of adjacent patterned electrodes within the threshold period of time after the initial decrease, the touch sensor may determine that a user has provided a touch and hold input to the touch sensor. An application being controlled by the touch sensor may perform a different operation based on whether a user has provided a touch and release input or a touch and hold input.

In some examples, the common plate electrode 120 may have a relatively high resistance. In these examples, movement of the common plate electrode 120 toward a pair of adjacent patterned electrodes (e.g., adjacent row and column electrodes) may cause an increase in capacitance between the pair of adjacent patterned electrodes. Accordingly, in these examples, the touch sensor may monitor for increases in capacitance between pairs of adjacent patterned electrodes and detect an input to the touch sensor (e.g., a touch input) when the touch sensor detects an increase in capacitance between a particular pair of adjacent patterned electrodes.

Figure 4A:
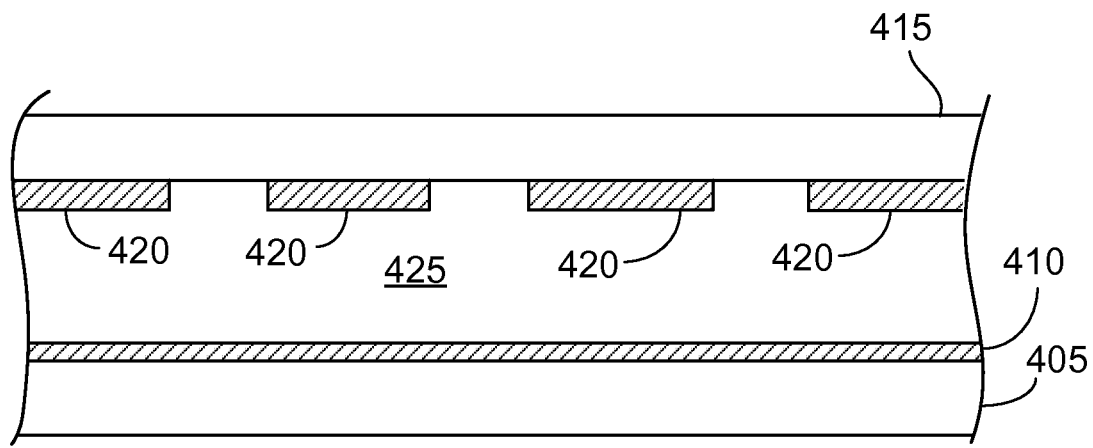
Figure 4B:
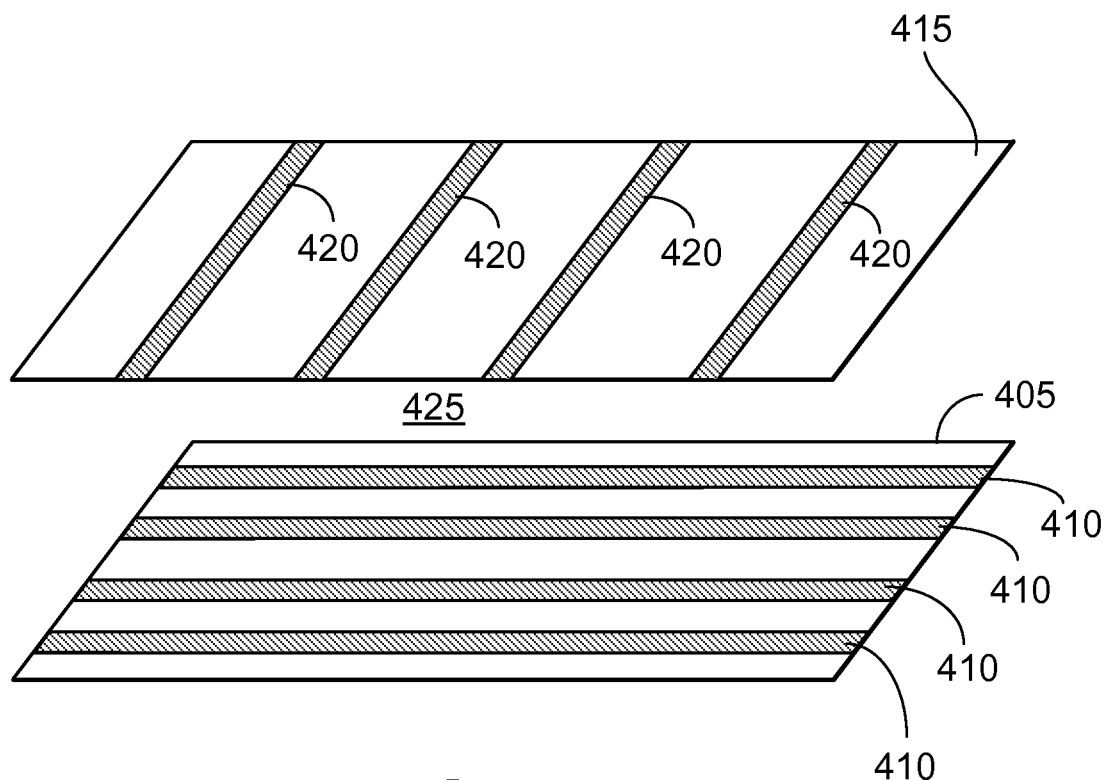

Referring to FIGS. 4A and 4B, in some implementations, a projected capacitive touch sensor includes a first transparent substrate 405 over which patterned transparent electrodes 410 are located and a second transparent substrate 415 under which patterned transparent electrodes 420 are located that is separated from the first transparent substrate 405 by a space that is occupied by a deformable, insulating (or semi-insulating) elastomer or fluid 425. As illustrated in FIGS. 4A and 4B, patterned electrodes 410 may be formed in a pattern of parallel lines on substrate 405, and patterned electrodes 420 may be formed in a pattern of parallel lines on substrate 415 such that patterned electrodes 410 are substantially orthogonal to patterned electrodes 420.

As with transparent substrates 105 and 115 of the projected capacitive touch sensor of FIGS. 1A and 2A, transparent substrates 405 and 415 of the projected capacitive touch sensor of FIGS. 4A and 4B may be composed from a glass or a polymer material. Likewise, patterned transparent electrodes 410 and 420 may be formed from a transparent conductor such as, for example, ITO.

When an input mechanism contacts the second substrate 415, the pressure applied by the input mechanism at the contact point causes the second substrate 415 to bend. In addition, the insulating (or semi-insulating) elastomer or fluid 425 also deforms or evacuates the space in the vicinity of the contact point due to the pressure applied by the input mechanism. As a result, the patterned electrodes 420 on the second substrate 415 are moved closer to the patterned electrodes 410 on the first substrate 405, causing an increase in the capacitance between the patterned electrodes 420 on the second substrate 415 and the patterned electrodes 410 on the first substrate in the vicinity of the contact point. Such changes in capacitance can be sensed by, for example, sequentially addressing the electrodes 410 on the first substrate 405 while sensing changes in current in the electrodes 420 on the second substrate 415, and locations where contact is made can be determined by detecting where changes in capacitance occur.

Figure 4C:
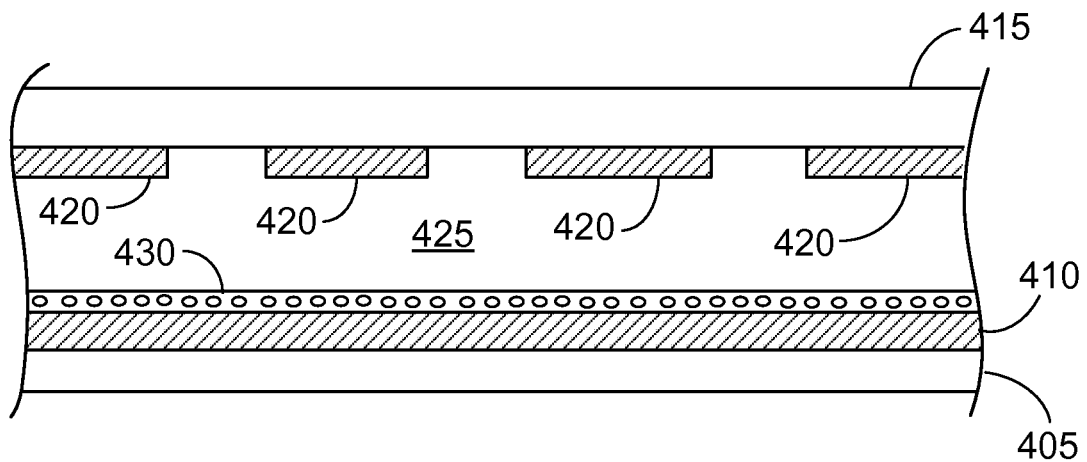

As illustrated in FIG. 4C, as a slight variant to the configuration illustrated in FIGS. 4A and 4B, in some implementations, a thin high dielectric constant film 430 is deposited over patterned electrodes 410. In such implementations, when an input mechanism applies pressure to the second substrate 415, the second substrate 415 and patterned electrodes 420 can bottom out on the thin high dielectric constant film 430 without causing a short circuit with patterned electrodes 410. Decreasing the spacing between patterned electrodes 420 and patterned electrodes 410 to a distance on the order of the thickness of the thin high dielectric constant film 430 allows for very significant increases in capacitance as a result of contact with the second substrate 415, which may substantially improve signal to noise ratio in the sensor.

In some implementations, a projected capacitive sensor may be integrated into an LCD device in a manner that relies on using the common electrode of the LCD device as a voltage reference plane for capacitive sensing.

Figure 5:
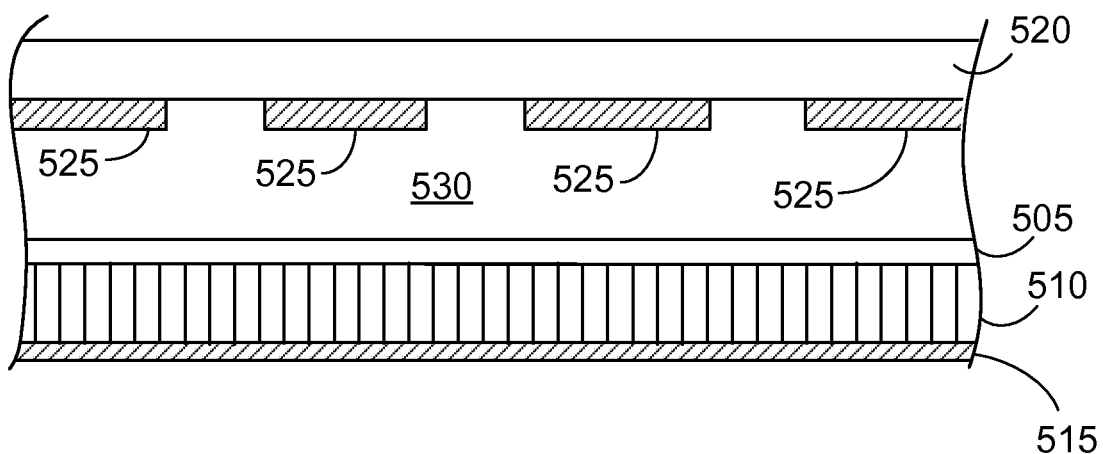

For example, referring to FIG. 5, an LCD device may include a transparent substrate 505 under which a color filter layer 510 and a common electrode 515 are located. As illustrated in FIG. 5, a projected capacitive sensor can be partially integrated within such an LCD device by adding a substrate 520, on which patterned electrodes 525 are formed, above transparent substrate 505, the color filter plate 510, and the common electrode 515, and separating the substrate 520 from the transparent substrate layer 505, the color filter plate 510, and the common electrode 515 by a space that is occupied with an insulating (or semi-insulating) elastomer or fluid 530. In such configurations, when an input mechanism makes contact with substrate 520, the pressure applied by the input mechanism to substrate 520 causes substrate 520 to bend, locally reducing the distance between the patterned electrodes 525 formed on substrate 520 and the common electrode 515 of the LCD device. This local change in the distance between the patterned electrodes 525 formed on substrate 520 and the common electrode 515 of the LCD device results in capacitance changes which can be sensed, enabling the point at which the input mechanism contacted substrate 520 to be located.

Figure 6A:
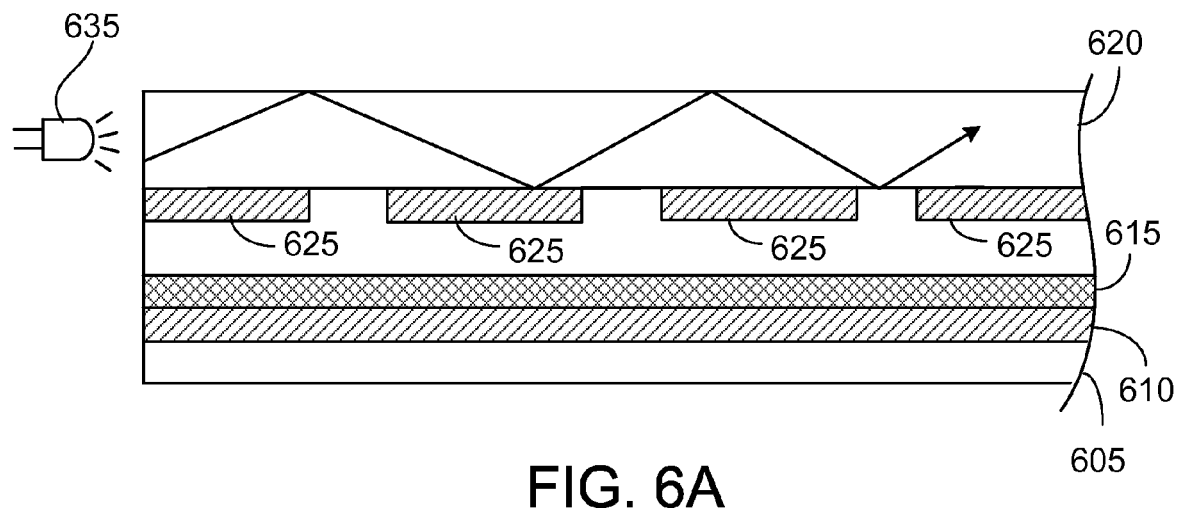

Referring to FIG. 6A, in another implementation, a projected capacitive sensor includes a first transparent substrate 605 over which patterned capacitance sensing electrodes 610 and a photo-capacitive layer (e.g., a photo-capacitive semiconductor) or a photo-conductive layer 615 are located and a second transparent substrate 620 below which patterned transparent electrodes 625 are located that is separated from the first transparent substrate 605 by an air gap. In some implementations, this air gap may be replaced by a deformable, insulating (or semi-insulating) elastomer or fluid. Transparent substrates 605 and 620 may be composed from a glass or a polymer material, and patterned transparent electrodes 610 and 625 may be formed from a transparent conductor such as, for example, ITO.

In addition, an electromagnetic radiation source 635 (e.g., a light emitting diode) configured to emit electromagnetic radiation within a desired range of wavelengths (e.g., infrared (IR)) is positioned adjacent to the second substrate 620 such that at least some of the electromagnetic radiation emitted by electromagnetic radiation source 635 is coupled into the second substrate 620. As illustrated in FIG. 6A, at least a portion of the electromagnetic radiation emitted into the second substrate 620 experiences total internal reflection (TIR) within the second transparent substrate 620 and propagates down the second transparent substrate 620.

When an input mechanism 640 (e.g., a finger) contacts the second substrate 620, the pressure applied by the input mechanism at the contact point causes the second substrate 620 to bend which, in turn, causes the distances between one or more of patterned electrodes 625 and one or more of patterned electrodes 610 to decrease. This results in changes in capacitance that can be sensed and used to determine the location at which contact was made with the second substrate 620.

When sufficient pressure is applied to the second substrate 620 to cause the second substrate 620 to contact the photo-capacitive or photo-conductive layer 615, total internal reflection of the electromagnetic radiation in the second substrate is frustrated such that at least some of the electromagnetic radiation trapped within the second substrate 620 escapes and is coupled into the photo-capacitive or photo-conductive layer 615. This causes a very significant increase in capacitance or conductance, which also can be sensed and used to determine the location of the point at which the input mechanism 640 contacted the second substrate 620. In this case, the relationship between changes in separation between the first and second transparent substrates 605 and 620 and the changes in capacitance or conductance is highly non-linear due to the changes in capacitance or conductance attributable to the photo-capacitive or photo-conductive layer 615, which may yield improved signal to noise ratio in the device. Although not illustrated as such, in some implementations, the second substrate 620 may be coated with an optical filter layer to promote TIR within the second substrate 620 when the second substrate 620 is not pressed down.

Figure 6B:
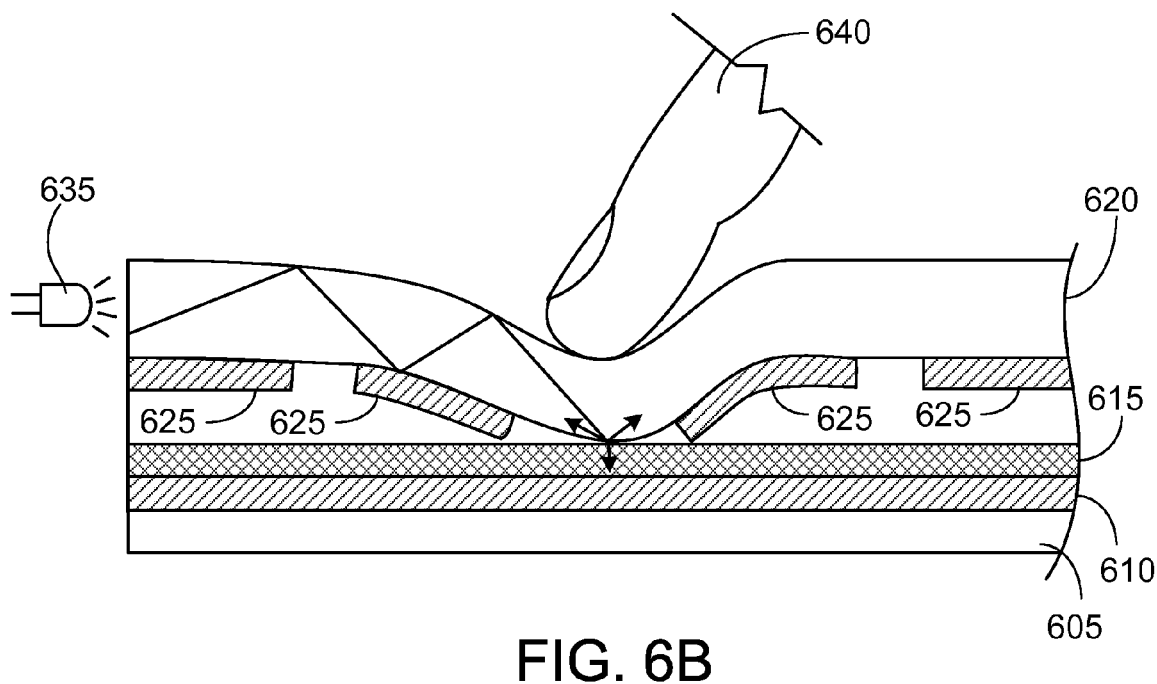

In some implementations, patterned electrodes 625 of FIG. 6B may be replaced with a common electrode, and points of contact with the second substrate 620 can be detected by sensing changes in capacitance between this common electrode and patterned electrodes 610, for example, in accordance with the techniques described above in connection with FIGS. 1A-1B and 2A-2B. In such implementations, patterned electrodes 610 may be laid out in a variety of different patterns. For example, in some implementations, patterned electrodes 610 may be laid out according to a diamond patterning scheme in which rows and columns of overlapping electrodes 610 are formed in a diamond pattern similar to the pattern of electrodes illustrated in FIG. 3.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A projected capacitive touch sensing system comprising:
a first substrate on which a common plate electrode is positioned;
an electromagnetic radiation source configured to emit electromagnetic radiation that is coupled into the first substrate, such that at least a portion of the emitted electromagnetic radiation experiences total internal reflection within the first substrate;
a second substrate on which patterned capacitive touch sensing electrodes that are oriented in a plane are positioned, the plane parallel and spaced apart from the common plate electrode, and the patterned capacitive touch sensing electrodes positioned such that each of a plurality of pairs of adjacent patterned capacitive touch sensing electrodes in the plane experience a capacitance therebetween, wherein the capacitance between a pair of the plurality of pairs of adjacent patterned capacitive touch sensing electrodes in the plane changes in response to changes in a distance between the first substrate on which the common plate electrode is positioned and the second substrate on which the pair of adjacent patterned capacitive touch sensing electrodes in the plane are positioned, and wherein the common plate electrode is common to the patterned capacitive touch sensing electrodes;
a photo-capacitive or photo-conductive layer positioned on the second substrate, wherein the photo-capacitive or photo-conductive layer causes chances in capacitance or conductance in response to chances in the distance between the first substrate and the second substrate on which the photo-capacitive or photo-conductive layer is positioned;
deformable dielectric material positioned between the common plate electrode and the patterned electrodes; and
electronic circuitry configured to sense changes in capacitance between the pair of adjacent patterned capacitive touch sensing electrodes and chances in capacitance or conductance of the photo-capacitive or photo-conductive layer in response to changes in the distance between the first substrate on which the common plate electrode is positioned and the second substrate on which the pair of adjacent patterned capacitive touch sensing electrodes and the photo-capacitive or photo-conductive layer are positioned, and determine an input based on the sensed change in capacitance between the pair of adjacent patterned capacitive touch sensing electrodes and chance in capacitance or conductance of the photo-capacitive or photo-conductive layer.

2. The projected capacitive touch sensing system of claim 1:
wherein the patterned capacitive touch sensing electrodes comprise a series of column electrodes and a series of row electrodes that are oriented perpendicular to the column electrodes, the series of column electrodes and the series of row electrodes being positioned such that adjacent row and column electrodes experience a capacitance therebetween, where the capacitance between a particular column electrode that is adjacent to a particular row electrode changes based on changes in a distance between the common plate electrode and the particular column electrode and the particular row electrode; and
wherein the electronic circuitry is configured to sense a change in capacitance between the particular column electrode and the particular row electrode and determine an input based on the sensed change in capacitance between the particular column electrode and the particular row electrode.

3. The projected capacitive touch sensing system of claim 2, wherein the electronic circuitry is configured to sense a capacitance between the particular column electrode and the particular row electrode independently of a capacitance between the particular column electrode and the common plate electrode and independently of a capacitance between the particular row electrode and the common plate electrode.

4. The projected capacitive touch sensing system of claim 2, wherein the series of column electrodes and the series of row electrodes are substantially coplanar.

5. The projected capacitive touch sensing system of claim 2:
wherein the series of column electrodes have a diamond pattern and the series of row electrodes have a diamond pattern such that the column electrodes and the row electrodes each have diamond-shaped pads that are located at positions where the column electrodes and the row electrodes do not overlap and that are connected by relatively narrow lines located at positions where the column electrodes and the row electrodes overlap;
wherein a capacitance between a diamond-shaped pad of the particular column electrode that is adjacent to a diamond-shaped pad of the particular row electrode changes based on changes in a distance between the common plate electrode and the particular column electrode and the particular row electrode; and
wherein the electronic circuitry is configured to sense a change in capacitance between the diamond-shaped pad of the particular column electrode and the diamond-shaped pad of the particular row electrode and determine an input based on the sensed change in capacitance between the diamond-shaped pad of the particular column electrode and the diamond-shaped pad of the particular row electrode.

6. The projected capacitive touch sensing system of claim 2, wherein the electronic circuitry comprises:
transmitters that are each positioned at one of the column electrodes and that are each configured to apply an excitation voltage to the corresponding column electrode;
receivers that are each positioned at one of the row electrodes and that are each configured to measure a current coupled into the corresponding row electrode based on excitation voltages applied to the column electrodes; and a processor configured to control the transmitters to apply excitation voltages to the column electrodes in a sequence in which only one column electrode is applied with an excitation voltage at a time, wherein the processor is configured to sense a change in capacitance between the particular column electrode and the particular row electrode by sensing a change in current measured by the receiver positioned at the particular row electrode at a time when the transmitter positioned at the particular column electrode was applying an excitation voltage to the particular column electrode.

7. The projected capacitive touch sensing system of claim 1, wherein the electronic circuitry is configured to sense a decrease in capacitance between the pair of adjacent patterned capacitive touch sensing electrodes and determine an input based on the sensed decrease in capacitance between the pair of adjacent patterned capacitive touch sensing electrodes.

8. The projected capacitive touch sensing system of claim 1, wherein the electronic circuitry is configured to sense an increase in capacitance between the pair of adjacent patterned capacitive touch sensing electrodes and determine an input based on the sensed increase in capacitance between the pair of adjacent patterned capacitive touch sensing electrodes.

9. The projected capacitive touch sensing system of claim 1, wherein the deformable dielectric material positioned between the common plate electrode and the patterned electrodes comprises an elastomer.

10. The projected capacitive touch sensing system of claim 1, wherein the deformable dielectric material positioned between the common plate electrode and the patterned electrodes comprises a fluid.

11. The projected capacitive touch sensing system of claim 10, wherein the deformable dielectric material positioned between the common plate electrode and the patterned electrodes comprises substantially air.

12. The projected capacitive touch sensing system of claim 1, wherein the deformable dielectric material positioned between the common plate electrode and the patterned electrodes comprises a sheet of compressible dielectric material.

13. The projected capacitive touch sensing system of claim 1, further comprising:
a display device that is configured to display an image and that is positioned below the common plate electrode, the patterned capacitive touch sensing electrodes, and the deformable dielectric material.

14. The projected capacitive touch sensing system of claim 13, wherein the common plate electrode is made of a transparent conductive material, the patterned capacitive touch sensing electrodes are made of the transparent conductive material, and the deformable dielectric material has an index of refraction that matches an index of refraction of the transparent conductive material such that images displayed by the display device are perceivable through the common plate electrode, the patterned capacitive touch sensing electrodes, and the deformable dielectric material.

15. The projected capacitive touch sensing system of claim 14, wherein the electronic circuitry is configured to determine a location of the determined input, map the location of the determined input to an image displayed by the display device, and control an application based on the mapping of the location of the determined input to the image displayed by the display device.

16. The projected capacitive touch sensing system of claim 1, wherein the electronic circuitry is configured to determine a touch input based on the sensed change in capacitance between the pair of adjacent patterned capacitive touch sensing electrodes.

17. The projected capacitive touch sensing system of claim 1, wherein the electronic circuitry is configured to sense an amount of change in capacitance between the pair of adjacent patterned capacitive touch sensing electrodes and determine an amount of force supplied based on the amount of change in capacitance between the pair of adjacent patterned capacitive touch sensing electrodes.

18. The projected capacitive touch sensing system of claim 1, wherein the first and second substrates are oriented such that the common plate electrode faces the patterned capacitive touch sensing electrodes and being configured to enable relative movement between the common plate electrode and the patterned capacitive touch sensing electrodes in response to a touch input.

19. The projected capacitive touch sensing system of claim 18, wherein the first substrate is relatively flexible and the second substrate is relatively rigid.

20. The projected capacitive touch sensing system of claim 19, wherein the first substrate has a surface that receives a touch input and is configured to bend in response to force applied by the touch input, thereby moving the common plate electrode closer to the patterned capacitive touch sensing electrodes in a vicinity of a contact point of the touch input.

21. The projected capacitive touch sensing system of claim 20, wherein the first substrate isolates electric fields from outside of the touch sensing system from impacting the capacitance between the pair of adjacent patterned capacitive touch sensing electrodes.

* * * * *